(12) United States Patent
Gallagher et al.

(10) Patent No.: US 8,191,305 B2
(45) Date of Patent: Jun. 5, 2012

(54) NETTING ARRANGEMENT

(76) Inventors: Danny Gallagher, Donegal (IE);
Donald John MacLean, Donegal (IE);
Anthony Breslin, Donegal (IE); Kevin Hayden, Donegal (IE)

( * ) Notice: Subject to any disclaimer, the term of this patent is extended or adjusted under 35 U.S.C. 154(b) by 500 days.

(21) Appl. No.: 12/516,794

(22) PCT Filed: Sep. 21, 2007

(86) PCT No.: PCT/EP2007/060067
§ 371 (c)(1),
(2), (4) Date: Aug. 3, 2009

(87) PCT Pub. No.: WO2008/064939
PCT Pub. Date: Jun. 5, 2008

(65) Prior Publication Data
US 2010/0064570 A1    Mar. 18, 2010

(30) Foreign Application Priority Data

Nov. 28, 2006 (EP) .................................. 06124950
May 2, 2007 (EP) .................................. 07107322

(51) Int. Cl.
*A01K 73/02* (2006.01)
(52) U.S. Cl. .................. 43/9.1; 43/9.2; 43/9.95
(58) Field of Classification Search ............ 43/9.1, 43/9.2, 9.95, 7
See application file for complete search history.

(56) References Cited

U.S. PATENT DOCUMENTS

| | | | | |
|---|---|---|---|---|
| 4,043,068 A * | 8/1977 | Savoie | ............... | 43/9.3 |
| 4,402,154 A * | 9/1983 | Pence | ............... | 43/9.2 |
| 4,805,335 A * | 2/1989 | West et al. | ................ | 43/9.2 |
| 5,222,318 A * | 6/1993 | Stokes et al. | .................. | 43/9.2 |
| 5,301,450 A * | 4/1994 | Boyd | ................. | 43/9.2 |
| 5,575,102 A * | 11/1996 | Coulon | ............... | 43/9.2 |
| 6,223,462 B1 * | 5/2001 | Johannesson | ................ | 43/9.2 |
| 6,343,433 B1 * | 2/2002 | Granberg | ................ | 43/6.5 |
| 7,028,846 B1 * | 4/2006 | Johnson | ................ | 209/660 |
| 2006/0225336 A1 | 10/2006 | Redfearn | | |
| 2006/0272196 A1* | 12/2006 | Safwat et al. | .............. | 43/9.95 |

FOREIGN PATENT DOCUMENTS

| | | |
|---|---|---|
| FR | 2 342 482 | 9/1997 |
| GB | 2353930 | 3/2001 |
| RU | 2 007 913 | 2/1994 |
| WO | WO 92/17999 | 10/1992 |
| WO | WO 98/36638 | 8/1998 |
| WO | WO 2008/064939 | 6/2008 |

OTHER PUBLICATIONS

Search Report dated Feb. 13, 2008 for PCT Application PCT/EP2007/060067.
Written Opinion for PCT Application PCT/EP2007/060067.
International Preliminary Report on Patentability dated Jun. 3, 2009 for PCT Application PCT/EP2007/060067.

* cited by examiner

*Primary Examiner* — Christopher P Ellis
(74) *Attorney, Agent, or Firm* — James P. Muraff; Neal, Gerber & Eisenberg LLP

(57) ABSTRACT

A netting arrangement for use in trawling is described. The arrangement includes a grid portion 120 which is desirably collapsible and is formed from a plurality of loops. Each of the loops are provided with four sides, two sides having a substantially rigid nature and being separated from one another by flexible interconnectors. A netting and ramp arrangement is also described wherein the ramp assists in the selective expulsion of juvenile and small fish from the net.

26 Claims, 5 Drawing Sheets

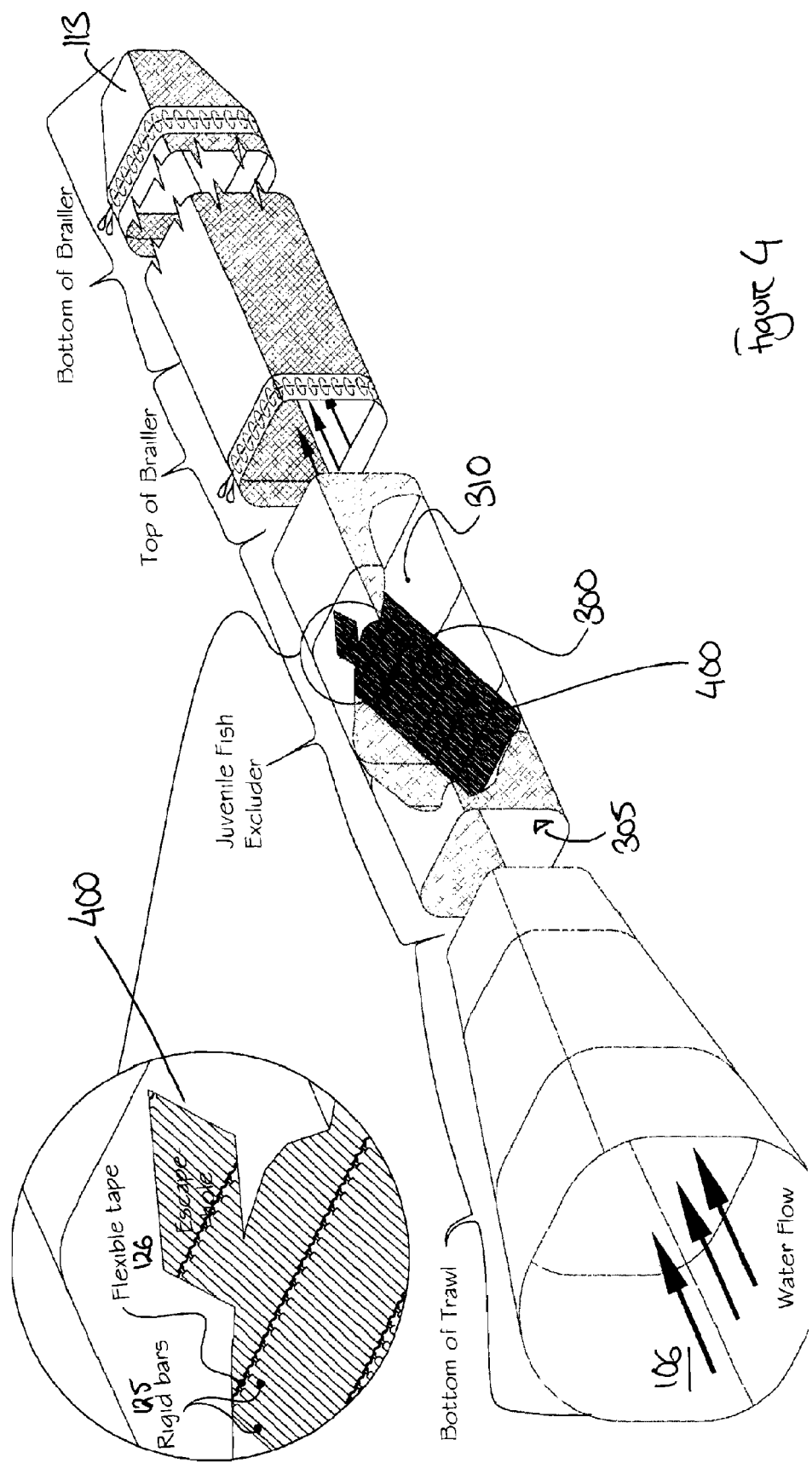

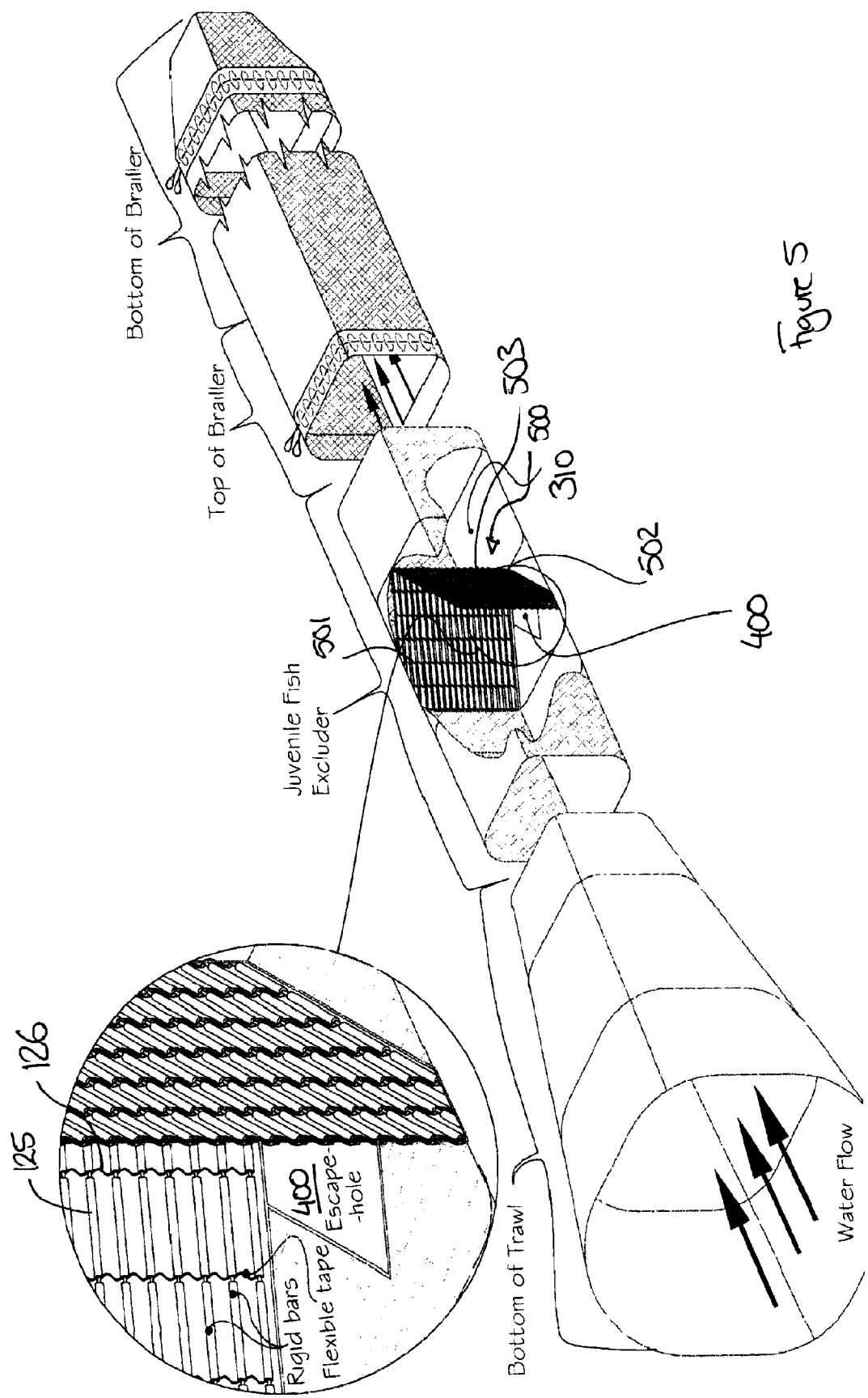

NETTING ARRANGEMENT

CROSS-REFERENCE

The present Non-Provisional Patent application is a continuation of International Application No. PCT/EP2007/060067, filed on 21 Sep. 2007, which claims priority to European Patent Application 06124950.4, filed on Nov. 28, 2006 and European Patent Application No. 07107322.5, filed on May 2, 2007. All of the above-mentioned patent applications are hereby incorporated by reference in their entirety.

FIELD OF THE INVENTION

The invention relates to fishing and in particular to trawling. The invention more particularly relates to netting arrangements for use in trawling such as pelagic or bottom trawling and used for selective discrimination in the catch so as to provide for improved selectivity in the size of the captured species. In one embodiment this may be used to reduce the possibility of capture of juvenile species, while in another it may be used to selectively disregard larger fish.

BACKGROUND

Pelagic trawling is the use of a cone-shaped net behind a boat to catch large schools of fish. It differs from benthic trawling—sometimes referred to as bottom trawling—in that as opposed to towing trawl nets along the sea floor, pelagic trawling provides for a towing higher up in the water column. In both trawling techniques, a flow of water passes through the net as the net is towed behind the fishing vessel.

A fishing trawl may be considered as having two main portions: the trawl-net portion which is the extended area of netting that serves to capture a large volume and which tapers inwardly towards a collecting bag or cod-end, where the captured fish are retained until the trawl is recovered on board the fishing vessel where they are then released and processed. The body of the trawl-net is funnel-like, wide at its mouth and narrowing towards the cod-end. It is long enough to assure adequate flow of water and prevent fish from escaping the net after subsequent capture. It is made of different grades of netting, the size of the mesh of the netting decreasing from the front of the net towards the cod-end. The cod end is where fish are finally caught. The size of mesh in the cod end is a determinant of the size of fish which the net catches.

Within the context of large scale trawling arrangement it is known to provide selective species discrimination to ensure for example that a fish capture is predominately the desired species. This is typically achieved by providing escape arrangements in the body of the trawl-net and is known for example in the context of tuna fishing to ensure that large populations of dolphin are not captured when the intended capture is tuna. While it is known to species select it is also known to grade the species being caught as well. Such fish grading is provided to attempt to minimise the numbers of juvenile fish that are caught within the trawl. The fish grading is achieved by controlling the sizes of mesh in the cod-end.

Such grading of species is important in modern fish management where there are strict controls on the volumes of fish caught and also on the minimum size of the catch. The use of larger mesh sizes in the collecting bag (cod end) was among the first technical measures imposed by fisheries managers to prevent the capture of juveniles. Such arrangements require the fish to reach the side netting to achieve their escape.

Other arrangements provide for selective dimensioning of portions of the collecting bag to attempt to create areas within the cod end where such juvenile species may escape. Such arrangements typically are arranged for small volumes of fish and are generally rigid in construction. Examples of such rigid constructions would include WO9217999 and U.S. Pat. No. 6,223,462 which both employ rigid grids. The rigidity of such structures is problematic both in scaling the size of the net arrangement and also when casting and retrieving the nets back on board the fishing vessel as it is important to ensure that the retrieved netting can be processed through the fishing gear and then stowed safely in a relatively small volume. The rigid structure of such known arrangements hinders this processing. There is therefore a need to provide a trawl netting arrangement that allows for selective discrimination in favour of a release of juvenile species, is flexible enough to be wound on to a net drum and also robust enough to withstand winding on to a net drum. GB2353930 describes an arrangement in which a grid array is provided from a plurality of loops. Each loop in the grid array includes tubes threaded on a netting line such that while the minimum dimensions of each of the loops are fixed, the minimum separation being defined by the length of each of the tubes, each of the tubes are pivotable on their netting line with respect to adjoining tubes, which is described as providing an improvement in handling compared to, for example, the previously described rigid steel grids. WO98/36638 describes a size-sorting trawl including a grille which provides for a selective preferential capture of smaller fishes whereas larger fishes are discriminated against. Such an arrangement is disadvantageous in pelagic fishing such as for herring or mackerel where volumes of fish of about 400 tonnes passing through the net in about 4-5 minutes is not unusual. If an arrangement such as that described in WO98/36638 was provided, the grille would provide an obstruction within the net with potential catastrophic results.

While the above described arrangements provide for a certain degree in selection in the size of the captured fish, there is a further need to provide a netting arrangement that provides for discriminative capture of the fish size. It is believed that whilst all of the above described arrangements improve the prospect of escape by juvenile species, there is still a need for an improved netting arrangement.

SUMMARY

These and other needs are addressed by a trawl netting arrangement in accordance with the teaching of the invention. Such an arrangement may include at least one grid portion formed from a plurality of loops, each loop having four sides, two sides of each loop being formed from longitudinally arranged substantially parallel rigid members and the other two sides being flexible, the flexible sides interconnecting the substantially rigid sides from one another such that each loop of the grid is collapsible, a collapse of the loop effecting a bringing together of the substantially rigid sides. The four sides of the loop are arranged such that each of the sides having the rigid members are separated from one another by the sides having no rigid member, in effect the two flexible interconnectors are arranged substantially perpendicularly to the two rigid members. The distance of respective neighbouring rigid members and interconnectors from one another defines the aperture dimensions of the individual loops which collectively define a grid having grid exit apertures.

Typically the netting arrangement includes a trawlnet portion and a cod-end portion, the cod-end portion having side walls formed from a mesh defining mesh exit apertures, the mesh exit apertures being smaller than the apertures defined by each of the loops within the grid portion. The grid portion is typically located within the cod-end portion.

The grid portion may be located as part of the side walls of the cod-end portion such that fish of a first size are retained within the cod-end portion by the mesh exit apertures but may escape from the netting through the larger grid exit apertures. In such an arrangement, the netting may further include within the cod-end region an internal region coincident with the location of the grid portion that includes a funnel configured to direct fish travelling within the cod-end portion towards the grid portion.

In another arrangement the grid portion is disposed across the cod-end portion to separate a first region of the cod-end portion from a second region of the cod-end portion. Such an arrangement may be effected by providing the grid portion as a divider extending across an inner region of the cod-end portion and dividing the cod-end portion into two segments, one on either side of the divider. In such an arrangement fish of a first dimension may pass through the divider from the first region into the second region and those of a second larger dimension are prevented from passing from the first region into the second region. The smaller fish are forced through the divider by the water flow within the cod-end portion and the size of the fish that are allowed through is determined by the size of the grid spacings.

To allow those fish of the second larger dimension to escape from the cod-end portion, side walls of the cod end portion may be configured to provide an escape hole through which the fish may escape out of the netting.

The divider may be configured as a planar surface extending transversely across the cod end portion. Such a surface may be provided so as to be substantially perpendicular to the side walls of the cod end portion, or could be provided with a slope such that it ramps from one side wall towards a second opposing side wall. The longitudinal rigid bars are desirably arranged to be orientated substantially parallel with the direction of water flow through the cod end portion.

In another arrangement the divider may be formed from two surfaces extending towards one another to form an apex such that fish are directed towards a mid region of the cod-end portion. Again, the longitudinal rigid bars are desirably arranged to be orientated substantially parallel with the direction of water flow through the cod end portion.

In another arrangement there is provided a trawl net arrangement including a netting component with at least one side panel having a series of mesh apertures of a first dimension and a grid portion having grid exit apertures of a second larger dimension defined therein. The netting arrangement further includes a ramp arrangement which is configured, in use, to direct fish travelling within the netting component towards and along the grid portion, the ramp arrangement serving to reduce the diameter within the netting component thereby increasing the water flow within the netting component and reducing the speed differential in the water between water speed internal to the netting component and water speed external to the netting component. Such a reduction in the differential servers to direct a water flow out of the grid portion thereby assisting in the release of juvenile or undersized fish through the grid portion and away from the netting component.

These and other features will be better understood with reference to the following drawings

BRIEF DESCRIPTION OF THE DRAWINGS

FIG. 4 is a perspective view showing a modification to the netting arrangement of FIG. 3.

FIG. 5 is a further modification showing an alternative location for a grid provided in accordance with the teaching of the invention.

DETAILED DESCRIPTION OF THE DRAWINGS

Figure 1:
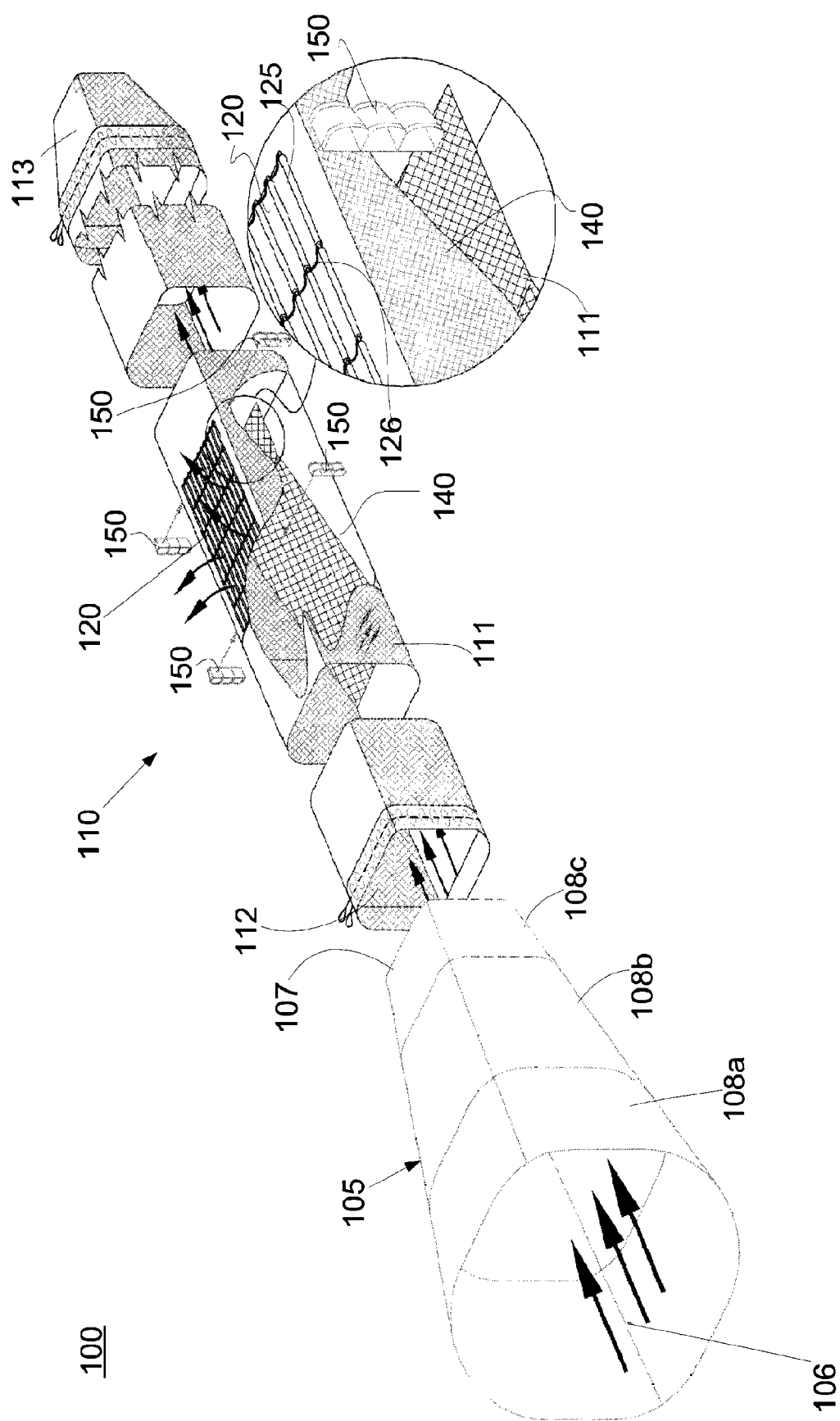
FIG. 1 is a perspective view of a trawling arrangement according to the teaching of the invention, with a partially exploded view of a portion of the arrangement.

As shown in FIG. 1, a trawling arrangement 100 in accordance with the teaching of the invention includes a trawlnet portion 105 and a cod-end portion 110. The body of the trawl-net is funnel-like, wide at its mouth 106 and narrowing towards the cod-end 107. It is long enough to assure adequate flow of water and prevent fish from escaping the net after subsequent capture. It is made of different grades of netting 108a, 108b, 108c, the size of the mesh of the netting decreasing from the front of the net towards the cod-end. As the fish are gathered up in the aft end of the trawl water flow is slowed down relative the towing speed of the trawl. The water flow in the aft end of the trawlnet portion is typically 90-95% of the towing speed—using for example T90 netting.

The cod-end portion 110 has side walls otherwise called outer panels formed from a mesh defining mesh exit apertures 111, typically formed in a diamond netting configuration. While it will be understood that the present invention is not to be limited to any one set of parameters the netting arrangement typically provides for an adjustment in the water flow speed such that the water flow in the forward end 112 of the cod-end portion has reduced to about 60-70% of the towing speed. At the aft end 113 of the cod-end portion this has reduced again to about 60% of the towing speed. This slowing down of water flow allows the smaller undersized and juvenile fish to keep pace with the trawl as it is being towed along.

According to one embodiment provided in accordance with the teaching of the invention at least one side wall of the cod-end portion may be configured to include at least one grid portion 120. The at least one grid portion may be configured to allow for changes in the grid (e.g. different spacings), for example by means of lacing in and out. The at least one grid portion is formed in this exemplary embodiment from parallel series of longitudinally arranged rigid bars 125, each series separated from one another by interconnectors 126 extending transversely to the bars, the distance of respective neighbouring bars and interconnectors from one another defining a grid. The rigid bars may be threaded onto a support line and may be rotatable about that line. Suitably, the interconnectors are flexible so that the grid arrangement collapses as it is being retrieved and rolled onto net drums. The longitudinally arranged rigid bars are substantially parallel to the longitudinal axis of the cod-end portion. The length of the individual bars is typically in the range of 15 cm to 50 cm depending on the nature of the fishing and the size of the trawler net drum. A length of 30 cm for the individual bars has been found to facilitate easy rolling on most trawler net drums. Again it will be understood that these dimensions are to be understood as exemplary dimensions and it is not intended to limit the application of the invention to any one set of parameters. Furthermore while the construction of the grid portion from a series of parallel rigid bars has been described and is preferable, it is possible that the grid could be formed from a series of flexible lines which when used are pulled, by the effect of the drag of the net in the water, under tension to define the necessary grid spacings and obviating the need for the rigid bars to provide the necessary structure for the grid.

The grid exit apertures 135 formed in this grid portion are larger than the mesh exit apertures 111 of the side walls. The provision of this grid portion or excluder takes advantage of water flow and fish behaviour to separate the larger more profitable fish from the smaller juvenile and undersized fish. The excluder aims to take advantage of the relative percentage frontal surface areas (the percentage of grid or twine surface area per meter when viewed straight on) of the cod-end netting and grading grids to direct a water flow out of the cod-end which will assist with the release of juvenile or undersized fish. It will be understood that by having grid exit apertures which are larger than the corresponding neighbouring mesh exit apertures that smaller fish are preferentially expelled through the grid and out of the net Standard cod-end netting when fished has a percentage frontal surface area in the region of 55%-85%. The release grid has a percentage frontal surface area of 26%-34% depending on grid spacing. This allows for a water flow through the grid approximately 1.6-3.2 times that of the water flow through the netting.

Figure 2:
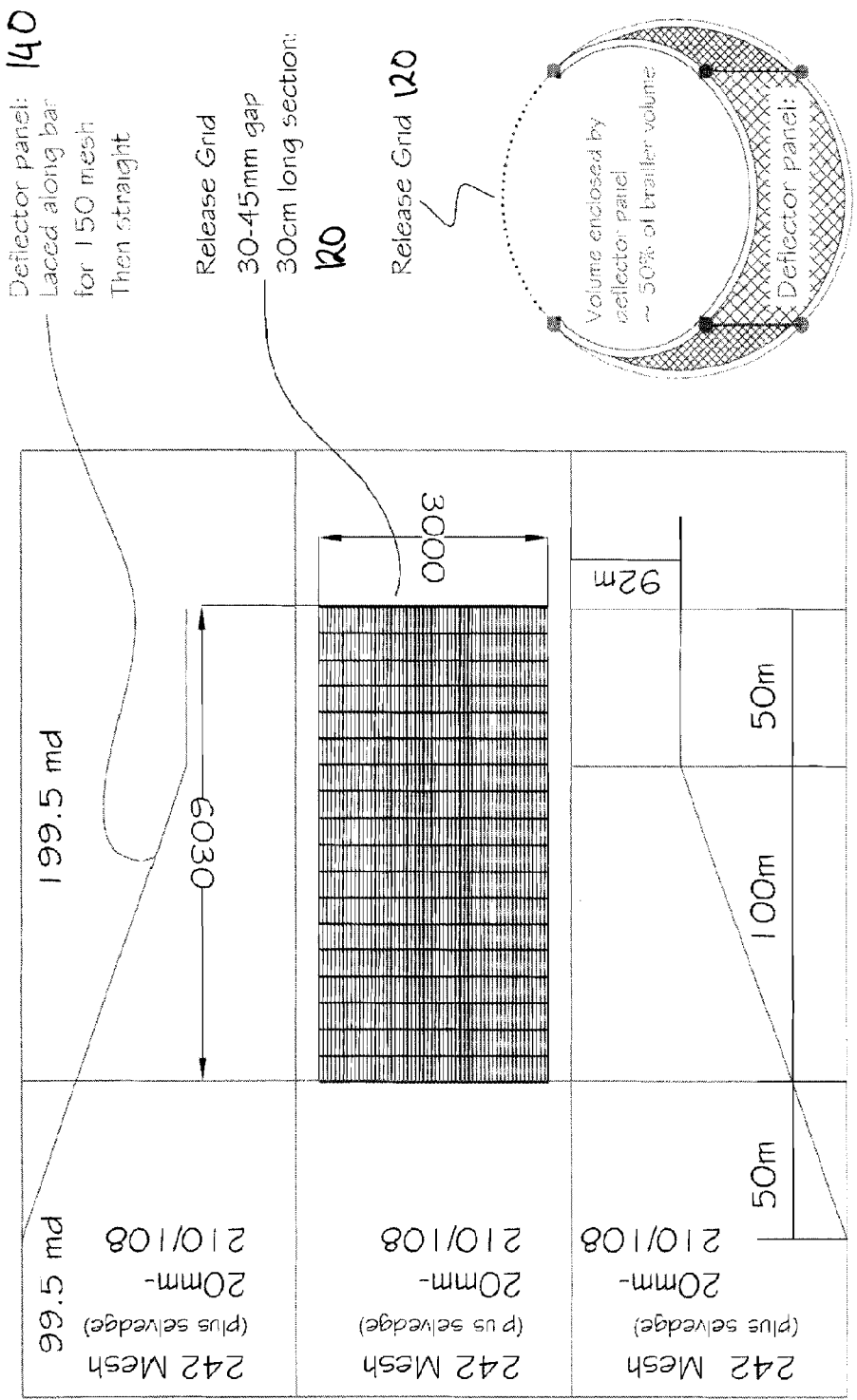
FIG. 2 is a view of an exemplary trawling arrangement laid out with some exemplary dimensions.

By providing such an arrangement fish that find themselves in the cod-end portion are not faced with as great a speed differential as would normally be found. The increase of the water flow through the grid assists fish in traversing from an interior portion of the cod-end towards the open water outside. To further assist in this traversal the cod end portion includes a directing means comprising a funnel (ramp) arrangement 140 configured to direct fish travelling within the cod-end portion towards the grid portion. Such a funnel of netting inside the cod-end serves to reduce the diameter of the cod-end by approximately 50% thereby increasing the water flow back towards towing speed. The closer the water speed internally within the cod-end portion is to the water speed outside the cod-end portion the easier it is for juvenile fish to escape. Typically, the funnel netting is made from the same netting material as the cod end portion. The funnel netting position would be as shown in FIGS. 1 and 2 with the netting attached to the side along the line of netting bars for approximately ⅔ of the side width and then along the direction of the mesh until the end of the grid so it will collapse flat and its correct operation is independent of the mesh opening. Thus for example, the ramp (funnel) starts ramping before the grid and ceases ramping before the end of the grid. In this way it will be understood that the ramp includes an angled portion 140a which is angularly offset from the side panel at an angle of about 30-60 degrees and optimally at about 45 degrees. The angled portion serves to preferentially direct fish towards the grid portion. Once the fish are adjacent to the grid portion, the ramp provides a parallel portion 140b which runs substantially parallel to the grid. A passage, having upper and lower parallel surfaces, is therefore defined within the interior volume by the grid 120 and the ramp parallel portion 140b respectively. In this way fish are forced to swim along the grid. Suitably, the offset between the start of the ramp and the grid represents approximately ⅓ of the length of the grid. It will be appreciated that in the exemplary structure shown the overall net diameter is substantially uniform in or about the ramp/grid area and that whilst the effective interior diameter is reduced by the funnelling arrangement, the external diameter remains substantially constant.

The provision of the netting funnel\ramp 140 as an inclined surface directed towards the release grid forces fish to swim along the grid and to direct the water flow through the grid. The grid spacing within the grid portion is suitably set to allow smaller fish to swim freely through the grid but still retains the larger fish. Very small fish are forced through the grid by water flow—the differential between the water speed internal to and external to the net having being reduced—which overcomes the problems of them lacking the strength to swim across the water flow.

The grid is desirably constructed of stiff hollow members or rods threaded longitudinally with high tenacity twines. In this way the substantially rigid members may be free to rotate on their individual twines. The members or rods may be in any suitable material, e.g. a suitable plastics material such as NYLON, acetals or a glass or carbon fibre construction. Suitably the rods whilst relatively stiff so that if they are loaded and bent out of shape, e.g. when rolled onto a drum, they resume their straight elongate shapes when unloaded. The nylon members have a smooth finish to reduce turbulence and noise that would deter fish from swimming through the grid.

It is believed that the escape behaviour of fish in cod-ends is influenced by a number of gear and environmental factors, including the visual impact of the netting. When seen from inside the net, against down-welling light, pale green or white netting can present a lower contrast compared with darker coloured twine, and therefore appear to be a clearer escape route to fish inside the net. As a result, the nylon members may be coloured in such a way as to present a lower visual impact to the fish than the surrounding netting so as to encourage fish to swim out through the grid. For example, the cod end section may be coloured in a high contrast colour such as black or red (this may vary with species and fishing depth or location) whereas the grid will be coloured in a low contrast colour such as white or pale green.

The grid spacing is set by flexible cross members of netting, twine or fabric that limits the maximum opening to a predetermined value and yet allows the grid to collapse completely for shooting and hauling operations of the trawl. The use of such interconnectors causes the adjacent rods to abut one another during such operations. The maximum transverse grid spacing is limited by the interconnector spacing. To maintain the desired grid spacing during a trawl, a tensioning means may be provided for stretching the grid during a trawl. An exemplary tensioning means comprises a plurality of hydrodynamic kites 150, arranged in the case of the exemplary arrangement in FIG. 1 as two pairs with two opposing kites positioned in the side walls adjacent to front and rear edges of the grid.

It will be understood that the grid is provided from a plurality of loops, each loop having four sides. By distinguishing the sides of the loops into two sides of each loop being formed from longitudinally arranged substantially parallel rigid bars and the other two sides being flexible, it is possible to provide a collapsible structure. The flexible sides which interconnect the substantially rigid sides from one another are foldable onto themselves such that each loop of the grid is collapsible, a collapse of the loop effecting a bringing together of the substantially rigid sides.

Heretofore the grid arrangement has been described as a means to selectively discriminate the catch so as to allow a release of small or juvenile fish. This was provided by embedding within the side wall of the cod-end portion a region formed from a grid. In another arrangement shown in FIG. 3, a grid portion 300 is disposed across the cod-end portion to separate a first region 305 of the cod-end portion from a second region 310 of the cod-end portion. This may be used to effectively divide the cod-end portion into two regions, a first region 305 located towards the trawlnet side 105 and a second region 310 located on the other side of the divider formed from the grid and remote from the trawlnet portion. By providing a divider extending across an inner region of the cod-end portion it is possible to divide the cod-end portion into two segments, one on either side of the divider. In such an arrangement fish of a first dimension may pass through the divider from the first region into the second region and those of a second larger dimension are prevented from passing from the first region into the second region. The smaller fish are forced through the divider by the water flow within the cod-end portion and the size of the fish that are allowed through is determined by the size of the grid spacings. Such an arrangement is advantageous for a number of reasons including the fact that species selection may be effected for example where it is desirable to catch a smaller species and disregard a larger species. Other benefits arise where for example larger more mature fish are disregarded in the catch and allowed to go free for breeding purposes.

As shown in FIG. 4, to allow those fish of the second larger dimension to escape from the cod-end portion, side walls of the cod end portion may be configured to provide an escape hole 400 through which the fish may escape out of the netting.

Figure 3:
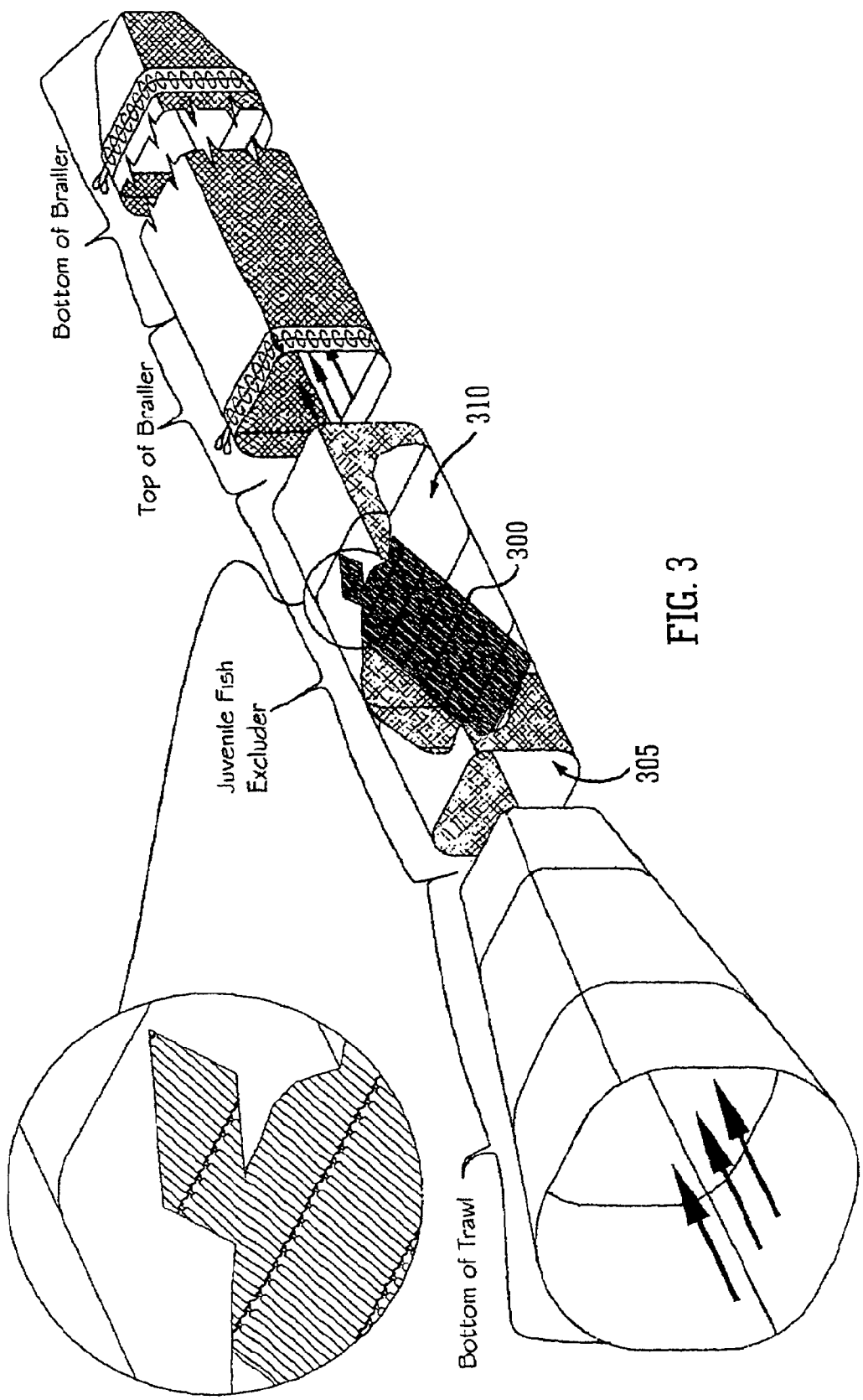
FIG. 3 is a perspective view of an alternative configuration.

The arrangements of FIGS. 3 and 4 show an example of the divider 300 configured as a planar surface extending transversely across the cod end portion. Such a surface may be provided so as to be substantially perpendicular to the side walls of the cod end portion, or as shown in FIGS. 3 and 4 could be provided with a slope such that it ramps from one side wall towards a second opposing side wall. The longitudinal rigid bars are desirably arranged to be orientated substantially parallel with the direction of water flow through the cod end portion.

In another arrangement, shown in FIG. 5, the divider may be formed from two surfaces 501, 502 extending towards one another to form an apex 503 such that fish are directed towards a mid region 504 of the cod-end portion. Again, the longitudinal rigid bars are desirably arranged to be orientated substantially parallel with the direction of water flow through the cod end portion. Again an escape hole may be provided to allow the fish which are retained in the first region to escape.

It will be understood that what has been described herein are exemplary arrangement of a grid which may be incorporated into trawl nets. Such a grid may be useful in both pelagic and bottom trawling. By providing the grid in a side wall of the netting, it is possible to selectively release smaller fish from the catch. By incorporating the grid within the netting it is possible to selectively capture smaller fish. While the invention has been described with reference to an exemplary arrangement where the grid is provided within what is commonly called the cod-end portion, it is not intended that the invention be so limited. A grid provided in accordance with the teaching of the invention may be provided in any side wall of any portion of the net.

Using a grid arrangement provided in accordance with the teaching of the invention where two sides of a loop within the grid are formed with substantially rigid members which are separated from one another by flexible inter-connectors allows a collapse of the grid onto itself. The flexible inter-connectors allow the bringing together of the rigid member to abut one another thereby forming a smaller grid which is useful in storage purposes. When being used within a trawl environment, the water flow through the nets causes the grid to expand to its defined shape, the width of each of the apertures within the grid being constrained by the length of the flexible inter-connectors and the length of the rigid members.

While the invention has been described with reference to exemplary embodiments it will be understood that these are provided to assist in an understanding of the teaching of the invention and elements or components described with reference to a first figure may be interchanged with those of another figure. Furthermore, the invention is not to be construed as being limited in any fashion except as may be deemed necessary in the light of the appended claims.

The words comprises/comprising when used in this specification are to specify the presence of stated features, integers, steps or components but does not preclude the presence or addition of one or more other features, integers, steps, components or groups thereof.

The invention claimed is:

1. A trawl netting arrangement including a main netting component and at least one grid portion formed from a plurality of loops, each loop having four sides, two sides of each loop being formed from longitudinally arranged substantially parallel rigid members and the other two sides being flexible, the flexible sides interconnecting the substantially rigid sides from one another such that each loop of the grid is collapsible, a collapse of the loop effecting a bringing together of the substantially rigid sides.

2. The netting arrangement of claim 1 wherein the distance of respective neighbouring rigid members and interconnectors from one another defines the aperture dimensions of the individual loops which collectively define a grid having grid exit apertures.

3. The netting arrangement of claim 2 wherein the main netting arrangement includes a trawlnet portion and a cod-end portion, the cod-end portion having side walls formed from a mesh defining mesh exit apertures and wherein the at least one grid portion is provided within the cod-end portion.

4. The netting arrangement of claim 3 wherein at least one side wall of the cod-end portion includes the at least one grid portion, the grid exit apertures being larger than the mesh exit apertures, and further wherein an internal region of the cod end portion coincident with the location of the grid portion includes a directing means configured to direct fish travelling within the cod-end portion towards the grid portion.

5. The netting arrangement as claimed in claim 4 wherein the provision of the directing means increases the water flow through the grid portion.

6. The netting arrangement of claim 3 wherein the grid portion is disposed across the cod-end portion to separate a first region of the cod-end portion from a second region of the cod-end portion to form a divider, such that fish of a first dimension may pass through the divider from the first region into the second region and those of a second larger dimension are prevented from passing from the first region into the second region.

7. The netting arrangement of claim 6 wherein at least one side wall of the cod-end portion is configured to provide an escape hole through which the fish of the second larger dimension to escape out of the netting.

8. The netting arrangement of claim 6 wherein the divider is configured as a planar surface extending transversely across the cod end portion so as to be substantially perpendicular to the side walls of the cod end portion, or to be provided with a slope such that it ramps from one side wall towards a second opposing side wall.

9. The netting arrangement of claim 6 wherein the divider is formed from two surfaces extending towards one another to form an apex such that fish are directed towards a mid region of the cod-end portion.

10. The netting arrangement of claim 8 wherein the longitudinal rigid members are arranged to be orientated substantially parallel with the direction of water flow through the cod end portion.

11. The arrangement as claimed in claim 1 wherein the rigid members are formed with a smooth surface to reduce turbulence effects.

12. The arrangement as claimed in claim 1 wherein the rigid members are selectively coloured to reduce their impact on the fish.

13. The arrangement as claimed in claim 1 further comprising a tensioning means for tensioning the grid portion to prevent the grid portion collapsing.

14. The arrangement of claim 13, wherein the tensioning means comprises a plurality of kites.

15. The arrangement of claim 4, wherein the directing means comprises a tapered mesh surface which acts as funnel within the net.

16. The arrangement of claim 1, wherein the grid portion is provided as a coloured material which contrasts with the colour of the netting material of the remainder of the netting.

17. A trawl netting arrangement including a netting component with at least one side panel having a series of mesh apertures of a first dimension and a grid portion having grid exit apertures of a second larger dimension defined therein, the netting arrangement further including a ramp arrangement configured, in use, to direct fish travelling within the netting component towards and along the grid portion, the ramp arrangement serving to reduce the diameter within the netting component thereby increasing the water flow within the netting component and reducing the speed differential in the water between water speed internal to the netting component and water speed external to the netting component so as to direct a water flow out of the grid portion thereby assisting in the release of juvenile or undersized fish through the grid portion and away from the netting component.

18. The netting arrangement of claim 17 wherein the ramp arrangement includes an angled portion which is angularly offset from the side panel at an angle of about 30-60 degrees and optimally at about 45 degrees, the angled portion operatively provide a preferential direction of fish towards the grid portion.

19. The netting arrangement of claim 18 wherein the ramp arrangement includes a parallel portion running substantially parallel to the grid portion, the parallel portion and grid portion defining a path therebetween.

20. The netting arrangement of claim 17 wherein the at least one grid portion is formed from a plurality of loops, each loop having four sides, two sides of each loop being formed from longitudinally arranged substantially parallel rigid members and the other two sides being flexible, the flexible sides interconnecting the substantially rigid sides from one another such that each loop of the grid is collapsible, a collapse of the loop effecting a bringing together of the substantially rigid sides.

21. The netting arrangement of claim 20 wherein the distance of respective neighbouring rigid members and interconnectors from one another defines the aperture dimensions of the individual loops which collectively define a grid having grid exit apertures.

22. The netting arrangement of claim 21 wherein the netting component includes a trawlnet portion and a cod-end portion, the cod-end portion having side walls formed from a mesh defining mesh exit apertures and wherein the at least one grid portion is provided within the cod-end portion.

23. The netting arrangement of claim 20 wherein the longitudinal rigid members are arranged to be orientated substantially parallel with the direction of water flow through the netting component.

24. The netting arrangement as claimed in claim 20 wherein the rigid members are formed with a smooth surface to reduce turbulence effects.

25. The netting arrangement as claimed in claim 20 wherein the rigid members are selectively coloured to reduce their impact on the fish.

26. The netting arrangement of claim 20 wherein at least two opposing side panels of the netting component are each provided with a series of mesh apertures of a first dimension and a grid portion 120 having grid exit apertures of a second larger dimension defined therein and wherein the ramp arrangement is configured to direct fish towards each of the grid portions.

* * * * *